United States Patent
D'Argenio et al.

(10) Patent No.: US 9,706,513 B2
(45) Date of Patent: Jul. 11, 2017

(54) POWER CONSERVATION ON USER DEVICES HAVING LOCATION IDENTIFICATION HARDWARE

(71) Applicants: Verizon Patent and Licensing Inc., Arlington, VA (US); Cellco Partnership, Arlington, VA (US)

(72) Inventors: Michael J. D'Argenio, Green Brook, NJ (US); Edward Gruskin, Verona, NJ (US); Kristopher T. Frazier, McKinney, TX (US); Lonnie Katai, Murphy, TX (US); James Y. Hwang, Jersey City, NJ (US); Abhishek S. Sheth, Piscataway, NJ (US); Matthew Santaiti, Basking Ridge, NJ (US); Gareth DeKlerk, East Windsor, NJ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 132 days.

(21) Appl. No.: 14/185,581

(22) Filed: Feb. 20, 2014

(65) Prior Publication Data
US 2015/0237593 A1 Aug. 20, 2015

(51) Int. Cl.
*H04W 24/00* (2009.01)
*H04W 64/00* (2009.01)
*H04W 52/02* (2009.01)

(52) U.S. Cl.
CPC ....... *H04W 64/00* (2013.01); *H04W 52/0209* (2013.01); *Y02B 60/50* (2013.01)

(58) Field of Classification Search
CPC .... G06F 1/3212; G06F 1/3231; G01S 5/0205; H04W 4/025
See application file for complete search history.

(56) References Cited

U.S. PATENT DOCUMENTS

| | | | | |
|---|---|---|---|---|
| 2008/0132197 A1* | 6/2008 | Koepke | ................... | H04L 12/66 455/404.2 |
| 2009/0040041 A1* | 2/2009 | Janetis | .................. | G01S 5/0027 340/539.13 |
| 2010/0255856 A1* | 10/2010 | Kansal | .................. | G01S 5/0205 455/456.1 |
| 2012/0052793 A1* | 3/2012 | Brisebois | ............... | H04W 88/06 455/1 |
| 2012/0142378 A1* | 6/2012 | Kim | ................... | H04N 21/4394 455/456.6 |
| 2013/0196613 A1* | 8/2013 | Graff-Radford | ........ | H04W 4/22 455/404.2 |
| 2013/0210408 A1* | 8/2013 | Hohteri | ................. | G06F 1/3231 455/418 |

(Continued)

*Primary Examiner* — Rashawn Tillery (57) ABSTRACT

A user device may detect, using a first radio associated with the user device, a presence of a location reference device; and determine a location associated with the user device. When determining the location associated with the user device, the user device is to receive location information from the location reference device, via the first, and refrain, based on detecting the presence of the location reference device, from determining the location using a second radio associated with the user device while the user device is within a communication range of the location reference device.

20 Claims, 10 Drawing Sheets

(56) References Cited

U.S. PATENT DOCUMENTS

| | | | |
|---|---|---|---|
| 2014/0064258 A1* | 3/2014 | Montag | H04W 84/12 370/338 |
| 2014/0128094 A1* | 5/2014 | Olson | G01S 5/145 455/456.1 |
| 2014/0148190 A1* | 5/2014 | Lancaster | H04W 4/025 455/454 |
| 2014/0281608 A1* | 9/2014 | Yin | G06F 1/3212 713/320 |
| 2015/0053144 A1* | 2/2015 | Bianchi | A01K 15/021 119/720 |

* cited by examiner

POWER CONSERVATION ON USER DEVICES HAVING LOCATION IDENTIFICATION HARDWARE

BACKGROUND

User devices utilize specialized hardware to determine geographic locations at which the user devices are currently located. For example, a user device may include a global positioning system (GPS) radio and/or some radio that may be used to determine the geographic location of the user device. Such radios and/or hardware may consume a relatively large amount of power on the user device.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may determine the location (e.g., the geographic location) of a user device based on the location of a location reference device (LRD). As such, the user device may refrain from determining its location using high-powered radios, such as global positioning system (GPS) radios, cellular radios, "Wi-Fi" radios, etc. As a result, power consumption by the user device may be reduced while the location of the user device may still be determined based the location of the LRD.

Figure 1A:
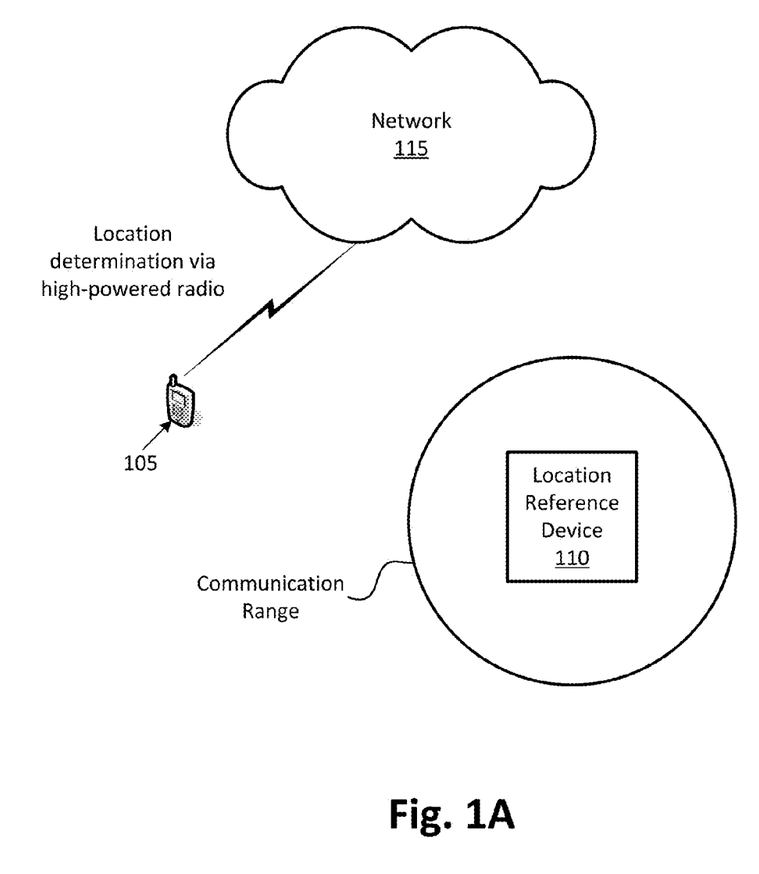
FIGS. 1A and 1B illustrate an example overview of an implementation described herein.
Figure 1B:
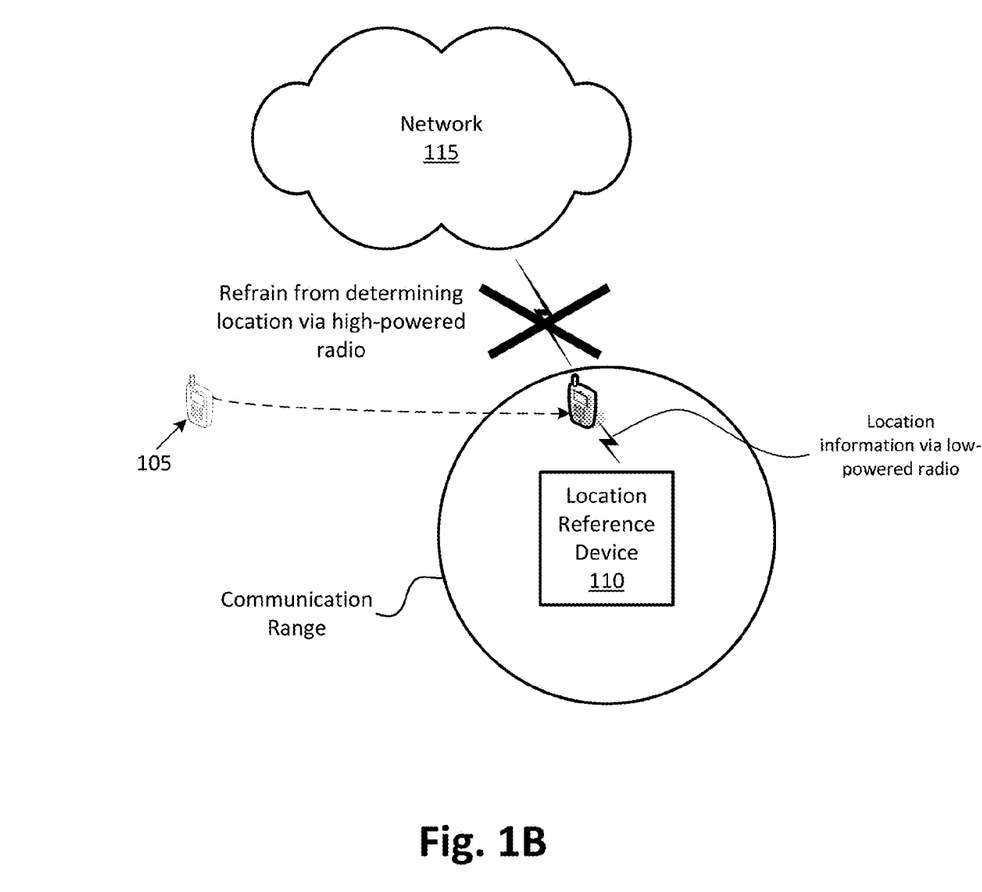

FIGS. 1A and 1B illustrate an example overview of an implementation described herein. As shown in FIG. 1A, user device 105, when located outside of a communications range of LRD 110, may communicate with network 115 to determine a current location of user device 105. For example, user device 105 may determine its current location based on location determination techniques that use one or more high-powered radios (e.g., radios that consume greater than a threshold amount of power, such as a GPS radios, cellular radios, "Wi-Fi" radios, etc.). As one example, network 115 may be a cellular network that determines a location of user device 105 using cellular triangulation.

Referring to FIG. 1B, user device 105 may communicate with LRD 110 when user device 105 enters a communication range of LRD 110. For example, user device 105 may communicate with LRD 110 via a low-powered radio (e.g., a radio that consumes less power than a high-powered radio), such as a radio frequency identification (RFID) radio, a Bluetooth Low Energy (BLE) radio, a Near-Field Communications (NFC) radio and/or some other radio. The location of user device 105 may be determined based on the location of LRD 110 so that user device 105 may refrain from determining its own location via the high-powered radio. For example, user device 105 may power down the high-powered radio, set the high-powered radio into an idle state, or discontinue software processes that determine location using the high-powered radio.

LRD 110 may store information that identifies its location, and that location information may be used to determine the location of user device 105. For example, LRD 110 may be a non-mobile device (e.g., a non-mobile beacon, or the like) that is located at a fixed location, and may store location information of the fixed location. Alternatively, LRD 110 may be a mobile device that may determine its current location using a GPS radio, a cellular radio, or the like. In some implementations, LRD 110 may determine an approximate location of user device 105 based on the location of LRD 110 and a signal strength of the communications between LRD 110 and user device 105.

In some implementations, LRD 110 may output, to user device 105, information identifying the location of user device 105. Once user device 105 receives the location information, a user of user device 105 may use the location information to locate nearby points of interests (POIs), obtain directions to another location, and/or perform some other task based on the location information.

Figure 2:
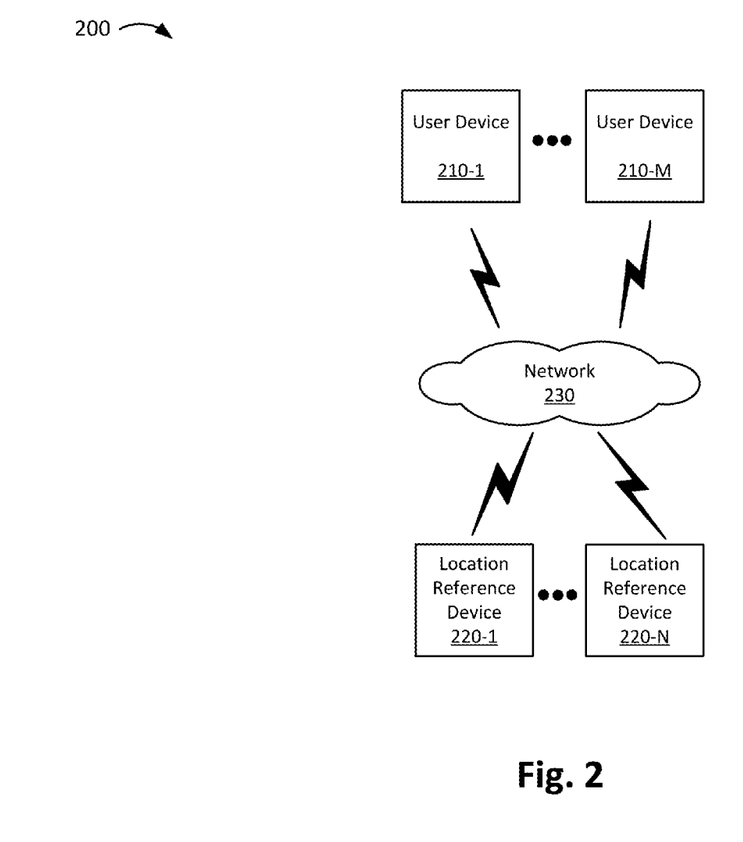
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1 through 210-M (where M is an integer greater than or equal to 1), LRD 220-1 through 220-N (where N is an integer greater than or equal to 1), and network 230.

User device 210 may include a mobile communication device capable of communicating via a network, such as network 230. For example, user device 210 may correspond to a smart phone or a personal digital assistant (PDA), a portable computer device (e.g., a laptop or a tablet computer), a wearable communications device, a gaming device, or the like. User device 210 may communicate with LRD 220 when entering a communication range of LRD 220. For example, user device 210 may communicate with LRD 220 using one or more first radios (e.g., low-powered radios, such as BLE radios, NFC radios, RFID radios, etc.). When user device 210 is outside of the communication range of LRD 220, user device 210 may determine its own location using location determination techniques that utilize one or more second radios, (e.g., high-powered radios, such as GPS radios, cellular radios, "Wi-Fi" radios, etc.).

LRD 220 may include a communication device capable of communicating via a network, such as network 230. In some implementations, LRD 220 may include a non-mobile device associated with a fixed location. For example, LRD 220 may include a beacon that is mounted to a non-mobile structure (e.g., a building, a utility post, etc.). Alternatively, LRD 220 may include a desktop computing device, a server device, or the like. In some implementations, LRD 220 may be a mobile device (e.g., smart phone, a (PDA), a portable computer device, etc.). LRD 220 may receive and/or store information identifying its own location. For example, if LRD 220 is a non-mobile device associated with a fixed location, LRD 220 may store information identifying the fixed location. Alternatively, if LRD 220 is a mobile device, LRD 220 may determine its current location via a GPS radio, a cellular radio, a "Wi-Fi" radio, or the like. LRD 220 may communicate with user device 210 via one or more low-powered radios (e.g., a BLE radio, an NFC radio, or the like) when user device 210 is within a communication range of LRD 220. LRD 220 may transmit a communication signal to permit user device 210 to detect the presence of LRD 220 and communicate with LRD 220.

Network 230 may include one or more wired and/or wireless networks. For example, network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 230 may include a local area network (LAN), a wide area network (WAN), a metropolitan network (MAN), the Public Switched Telephone Network (PSTN), an ad hoc network, a managed Internet Protocol (IP network, a virtual private network (VPN), an intranet, the Internet, a fiber optic-based network, and/or a combination of these or other types of networks.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
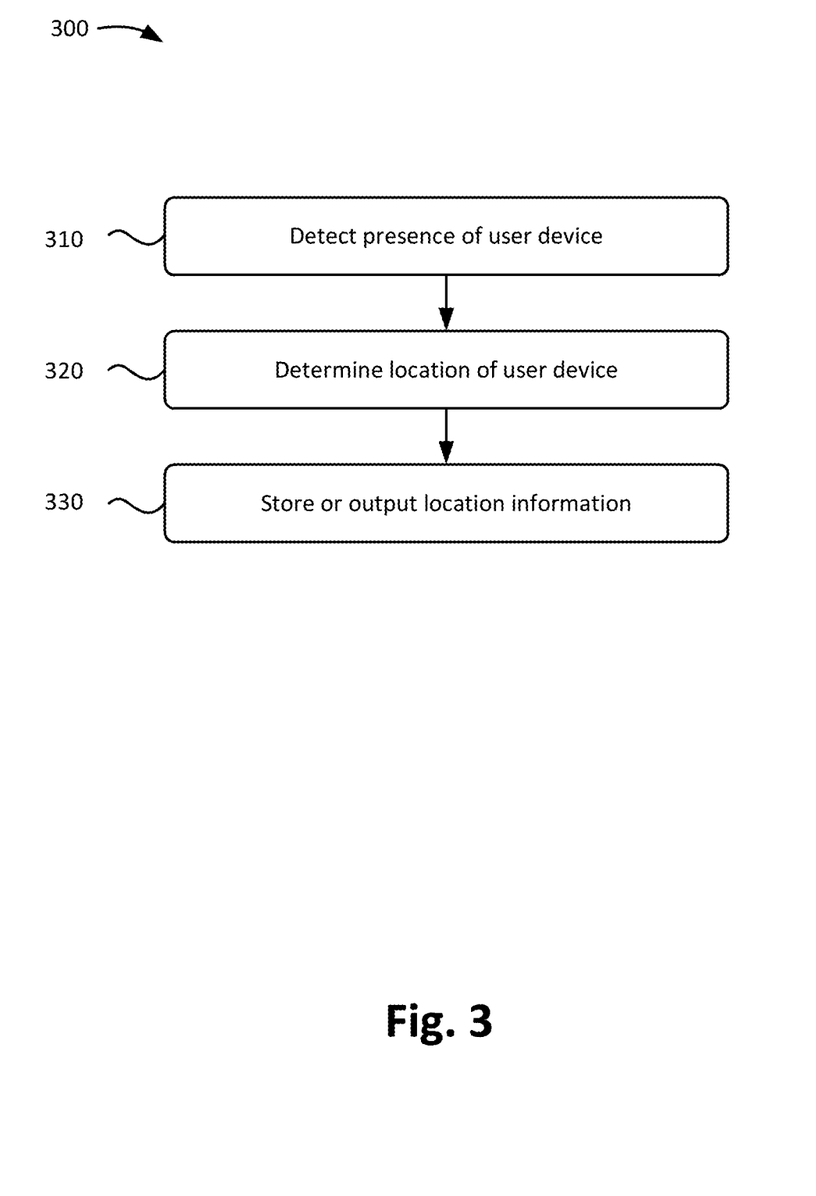
FIG. 3 illustrates a flowchart of an example process for storing or outputting location information to a user device.

FIG. 3 illustrates a flowchart of an example process 300 for storing or outputting location information to a user device. In some implementations, process 300 may be performed by LRD 220. In some implementations, some or all of blocks of process 300 may be performed by one or more other devices in environment 200 (e.g., user device 210), in addition to, or in lieu of, LRD 220.

As shown in FIG. 3, process 300 may include detecting the presence of a user device (block 310). For example, LRD 220 may detect the presence of user device 210 when user device 210 enters a communication range of LRD 220. In some implementations, user device 210 may transmit a communication signal from one or more low-powered radios. When user device 210 enters the communication range of LRD 220, LRD 220 may detect the presence of user device 210 by detecting the presence of the communication signal transmitted by user device 210. LRD 220 may also transmit a communication signal to user device 210, which user device 210 may receive via a passive receiver. User device 210 may transmit a response based on receiving the communication signal via the passive receiver.

Based on detecting the presence of user device 210, LRD 220 may establish communications with user device 210 via the one or more low-powered radios. In some implementations, user device 210 may refrain from obtaining its own location using one or more high-powered radios once the communication with LRD 220 has been established. For example, user device 210 may refrain from requesting location information from a cellular network.

Process 300 may also include determining the location of the user device (block 320). For example, LRD 220 may determine the location of user device 210 in response to establishing communications with user device 210. In some implementations, LRD 220 may determine the location of user device 210 based on the location of LRD 220. As described above, LRD 220 may store information identifying its own location. For example, LRD 220 may store information identifying a fixed location (e.g., when LRD 220 is a non-mobile device associated with the fixed location). Alternatively, LRD 220 may determine its own location using one more location determination techniques (e.g., location determination techniques that may involve the use of a GPS radio, a cellular or "Wi-Fi" radio for location triangulation techniques, etc.).

In some implementations, LRD 220 may determine an area in which user device 210 is located. For example, LRD 220 may determine an area defined by a geographic position (e.g., as identified by longitude/latitude coordinates, a street address, etc.) and a perimeter. The geographic position may correspond to the location of LRD 220, and the perimeter may correspond to the communications range of LRD 220. In some implementations, LRD 220 may determine a smaller perimeter than the communications range based on the signal strength of the communication between user device 210 and LRD 220. For example, LRD 220 may determine a relatively smaller perimeter for a relatively stronger signal strength. Thus, in some implementations, the determination location of user device 210 may be a perimeter of or area based on the location of LRD 220 and an estimated distance from LRD 220 based on the signal strength.

Process 300 may further include storing or outputting the location information (block 330). For example, LRD 220 may store or output the location information identifying the location of user device 210. In some implementations, the location information may identify the area defined by the geographic position and the perimeter. In some implementations, LRD 220 may store the location information to permit a user of LRD 220 to identify the location of user device 210. In some implementations, LRD 220 may provide the location information to user device 210 and/or to some other device.

Figure 4:
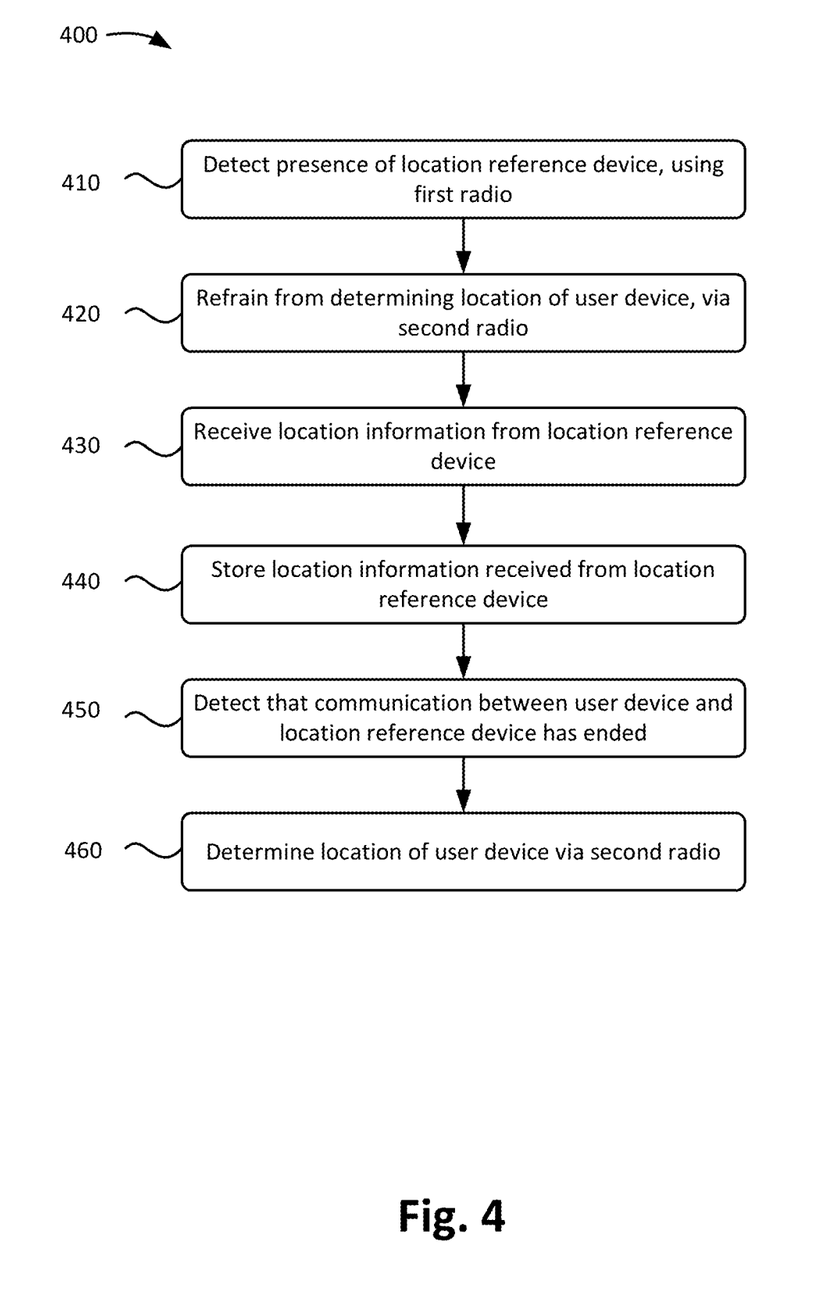
FIG. 4 illustrates a flowchart of an example process for causing a user device to refrain from determining its location via a high-powered radio.

FIG. 4 illustrates a flowchart of an example process 400 for causing a user device to refrain from determining its location via a high-powered radio. In some implementations, process 400 may be performed by user device 210. In some implementations, some or all of blocks of process 400 may be performed by other devices in environment 200 (e.g., LRD 220), in addition to, or in lieu of, user device 210.

As shown in FIG. 4, process 400 may include detecting the presence of a location reference device, using a first radio (block 410). For example, user device 210 may detect the presence of LRD 220 when user device 210 enters a communication range of LRD 220 (or when LRD 220 enters the communication range of user device 210). For instance, LRD 220 may transmit a communication signal that user device 210 may detect when user device 210 is within communication range of LRD 220. User device 210 may detect LRD 220 via a first radio (e.g., a low-powered radio).

Process 400 may further include refraining from determining the location of the user device, via a second radio (block 420). For example, user device 210 may refrain from determining its own location via the second radio (e.g., a high-powered radio), based on detecting the presence of LRD 220. Additionally, or alternatively, user device 210 may refrain from determining is own location via the second radio further based on some other factor. For example, user device 210 may refrain from determining its own location via the second radio based on a signal strength of the communication between user device 210 and LRD 220 (e.g., user device 210 may refrain from determining its own location when the signal strength satisfies a particular threshold).

Additionally, or alternatively, user device 210 may refrain from determining its own location via the second radio when LRD 220 provides an instruction to direct user device 210 to refrain from determining its own location. Additionally, or alternatively, user device 210 may refrain from determining its own location via the second radio when user device 210 has maintained communication with LRD 220 for greater than a threshold period of time (e.g., to prevent user device 210 from prematurely refraining from determining its own location). Additionally, or alternatively, user device 210 may refrain from determining its own location via the second radio based on a measure of performance of the communication between LRD 220 and user device 210 (e.g., a measure of latency, data rates, jitter, etc. associated with the communication between LRD 220 and user device 210). Additionally, or alternatively, user device 210 may refrain from determining its own location via the second radio when a user has selected to permit user device 210 to refrain from determining its own location via the second radio.

In some implementations, user device 210 may refrain from determining its own location via the second radio by powering off the second radio, switching the second radio into an idle mode, and/or discontinuing software processes that determine the location of user device 210 using the second radio. Additionally, or alternatively, user device 210 may refrain from determining its own location using some other technique. As described above, LRD 220 may determine the location of user device 210 when LRD 220 and user device 210 establish communication. Power consumption on user device 210 may be reduced when user device 210 refrains from determining its own location using the second radio.

In some implementations, user device 210 may begin to communicate via a third radio based on detecting the presence of LRD 220. As an example, user device 210 may begin to communicate via a "Wi-Fi" radio user device 210 detects the presence of LRD 220 and when the location of LRD 220 is associated a "Wi-Fi" hotspot. In some implementations, user device 210 may refrain from communicating via the third radio based on detecting the presence of LRD 220. As an example, user device 210 may refrain from communicating via the "Wi-Fi" radio, and instead, communicate via a "ZigBee" radio, when the location of LRD 220 is associated with a location that has a ZigBee wireless network.

Process 400 may also include receiving location information from the location reference device (block 430). For example, user device 210 may receive the location information from LRD 220. In some implementations, the location information may identify an area in which user device 210 is located. The area may be defined by a geographic position (e.g., longitude/latitude coordinates, a street address, etc.) and a perimeter. As described above, the geographic position may correspond to the location of LRD 220, and the perimeter may correspond to the communications range of LRD 220. Alternatively, the perimeter may correspond to a narrowed perimeter determined by LRD 220 based on a signal strength between user device 210 and LRD 220.

Process 400 may further include storing or outputting the location information received from the location reference device (block 440). For example, user device 210 may store the location information to permit a user of user device 210 to access the location information. In some implementations, the user may access the location information to identify the location on a map, obtain directions from the location to another location, share the location information with others, or perform some other task using the location information.

Process 400 may also include detecting that the communication between the user device and the location reference device has ended (block 450). For example, user device 210 may detect that the communication between the user device and LRD 220 has ended when user device 210 has exited the communication range of LRD 220 (or when LRD 220 has exited the communication range of user device 210). Alternatively, user device 210 may detect that the communication between the user device and LRD 220 has ended when a radio on LRD 220, used to communicate with user device 210, has been powered off, or has otherwise ended the transmission of a communication signal used to establish and maintain the communication between user device 210 and LRD 220.

Process 400 may further include determining the location of the user device via the second radio (block 460). For example, user device 210 may determine its own location using the second radio based on detecting that the communication between the user device and the location reference device has ended. In some implementations, user device 210 may determine its own location by powering on the second radio, switching the second radio from an idle mode to an active mode, and/or starting or resuming software processes that determine the location of user device 210 using the second radio. Further, user device 210 may use the second radio to determine the location of user device 210 using a location determination technique. For example, user device 210 may use the second radio to receive longitude/latitude coordinates, perform cellular or "Wi-Fi" triangulation techniques, etc. As a result, user device 210 may determine its own location when the communication between user device 210 and LRD 220 has ended.

Figure 5:
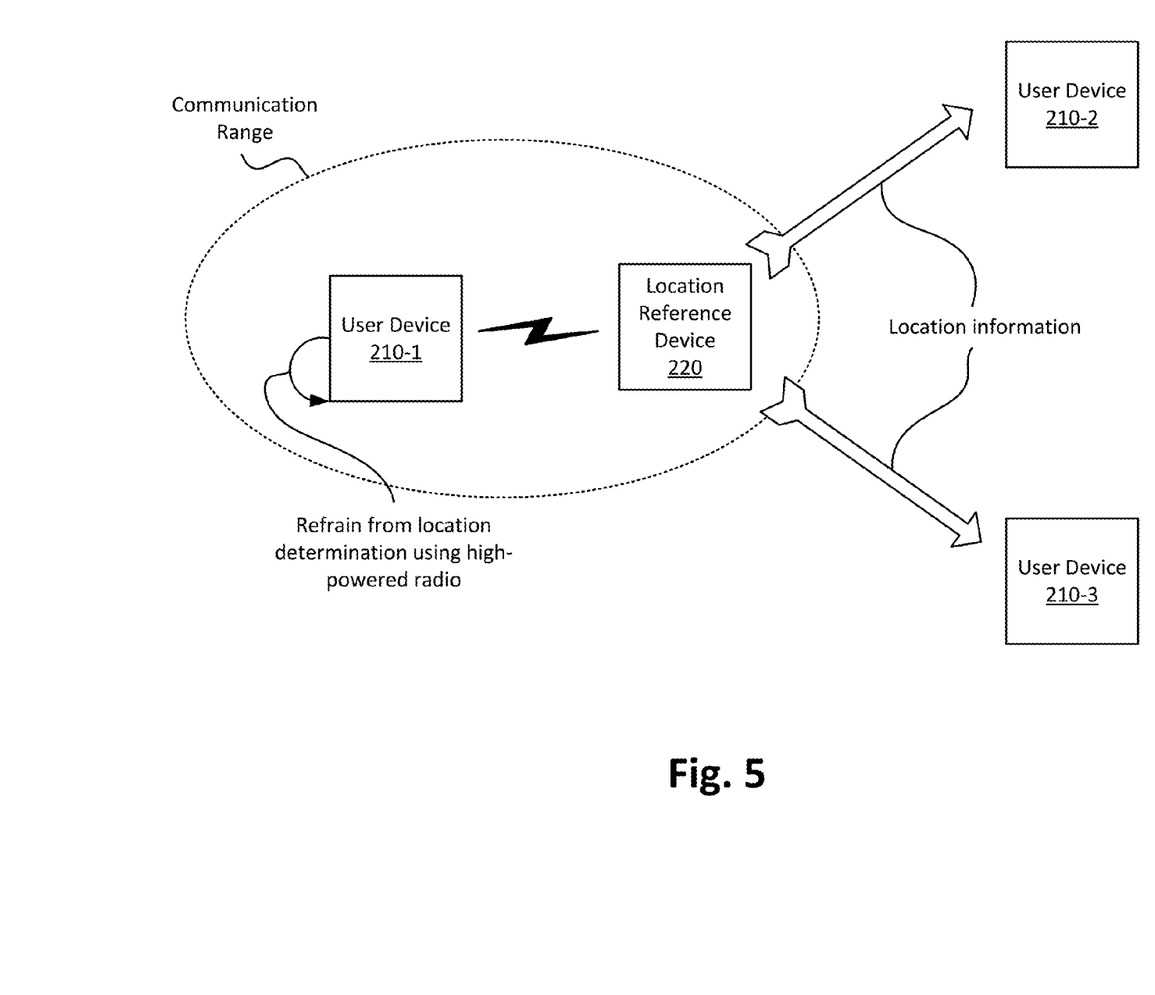
FIGS. 5-7, 8A, and 8B illustrate example implementations for causing a user device to refrain from determining location via a high-powered radio.

FIGS. 5-7, 8A, and 8B illustrate example implementations for causing a user device to refrain from determining location via a high-powered radio. Referring to FIG. 5, a first user device 210 (e.g., user device 210-1) may communicate with LRD 220 when user device 210-1 enters the communication range of LRD 220. As described above, user device 210-1 may refrain from determining its own location using a high-powered radio, thereby reducing power consumption on user device 210-1. LRD 220 may determine the location of user device 210-1 based on the location of LRD 220, and may provide information identifying the location of user device 210-1 to other devices, such as a second user device 210 (e.g., user device 210-2) and a third user device 210 (e.g., user device 210-3). For example, LRD 220 may provide the information identifying the location of user device 210-1 when a user of user device 210-1 selects to share the location information with user device 210-2 and user device 210-3.

Figure 6:
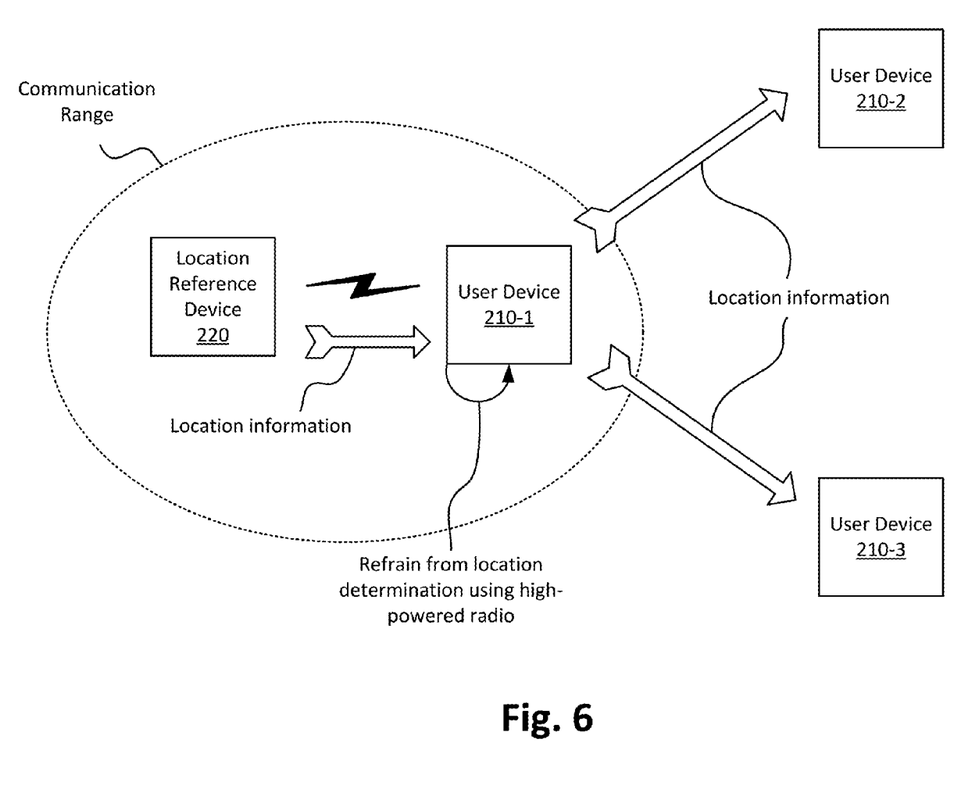

Referring to FIG. 6, a first user device 210 (e.g., user device 210-1) may communicate with LRD 220 when user device 210-1 enters the communication range of LRD 220. User device 210-1 may refrain from determining its own location using a high-powered radio, based on communicating with LRD 220. LRD 220 may determine the location of user device 210-1 and may provide information identifying the location to user device 210-1. Once user device 210-1 receive the location information, user device 210-1 may provide the location information to other devices, such as a second user device 210 (e.g., user device 210-2) and a third user device 210 (e.g., user device 210-3). For example, user device 210-1 may provide the location information based on receiving an instruction from a user to share the location information with user device 210-2 and user device 210-3.

Figure 7:
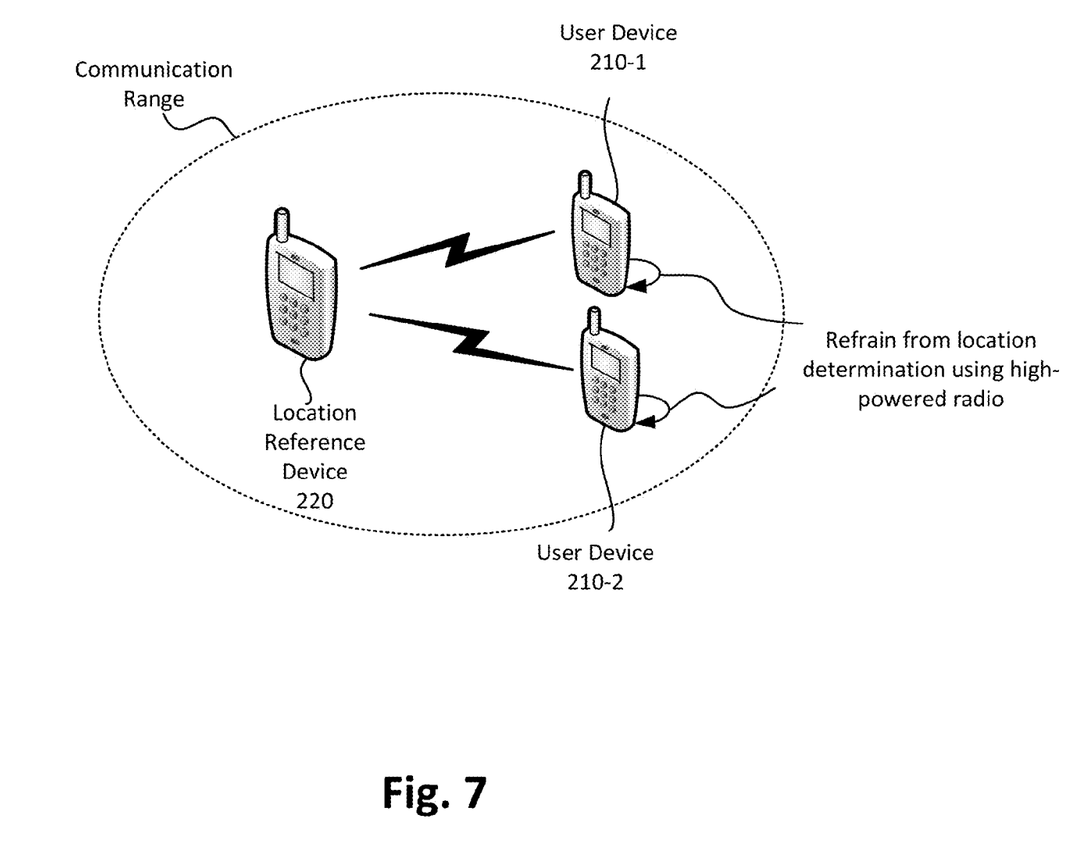

Referring to FIG. 7, multiple user devices 210 may communicate with a single LRD 220. As shown in FIG. 7, LRD 220 may be a mobile device and may communicate with the multiple user devices 210 (e.g., user device 210-1 and user device 210-2). Based on communicating with LRD 220, user device 210-1 and user device 210-2 may each refrain from determining their own locations using respective high-powered radios. Further, LRD 220 may determine the locations of user device 210-1 and user device 210-2, store corresponding location information, provide the corresponding location information to other devices, or provide the corresponding location information to user device 210-1 and user device 210-2. As a result, the location of user device 210-1 and user device 210-2 may be determined while each of user device 210-1 and user device 210-2 may refrain from determining their respective locations using high-powered radios.

Figure 8A:
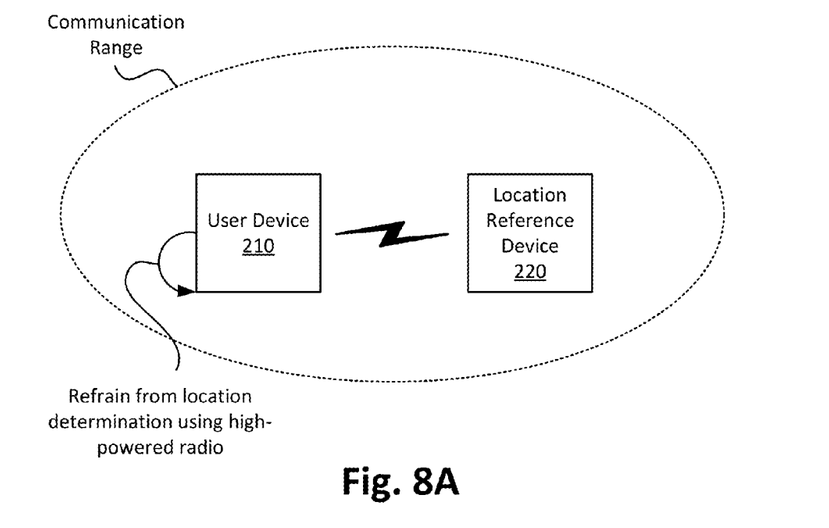
Figure 8B:
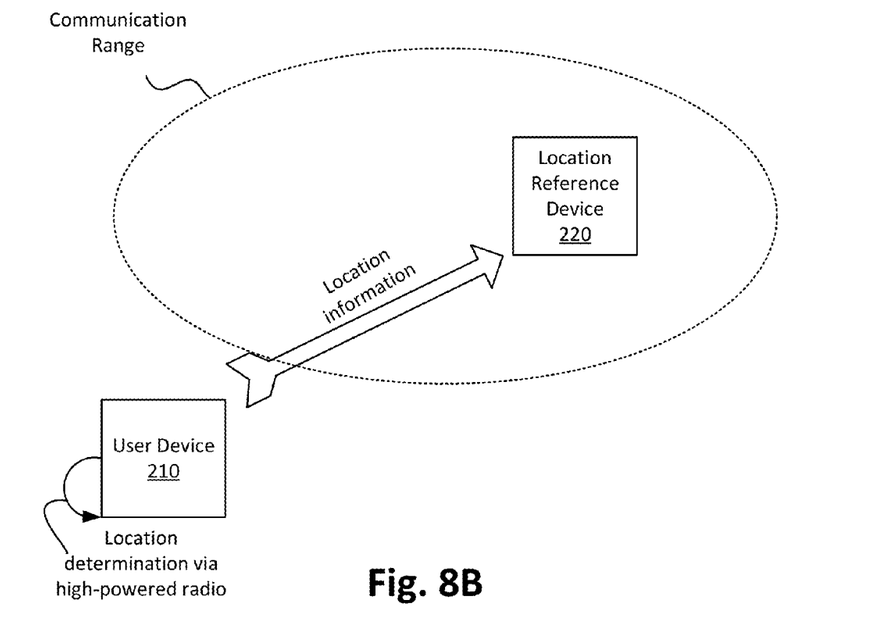

Referring to FIG. 8A, user device 210 may refrain from determining its own location based on communicating with LRD 220. Referring to FIG. 8B, user device 210 may determine its own location when user device 210 exits a communication range of LRD 220, or when the communication between user device 210 and LRD 220 otherwise ends. Once user device 210 determines its own location, user device 210 may provide information identifying the location to LRD 220 so that LRD 220 may store the location information even when user device 210 exits the communication range. LRD 220 may maintain information regarding locations out of its communications range so that LRD 220 may refine a definition of its communications range.

While particular examples are shown in FIGS. 5-7, and FIGS. 8A and 8B, the above descriptions are merely example implementations. In practice, other examples are possible from what is described above in FIGS. 5-7, and FIGS. 8A and 8B.

Figure 9:
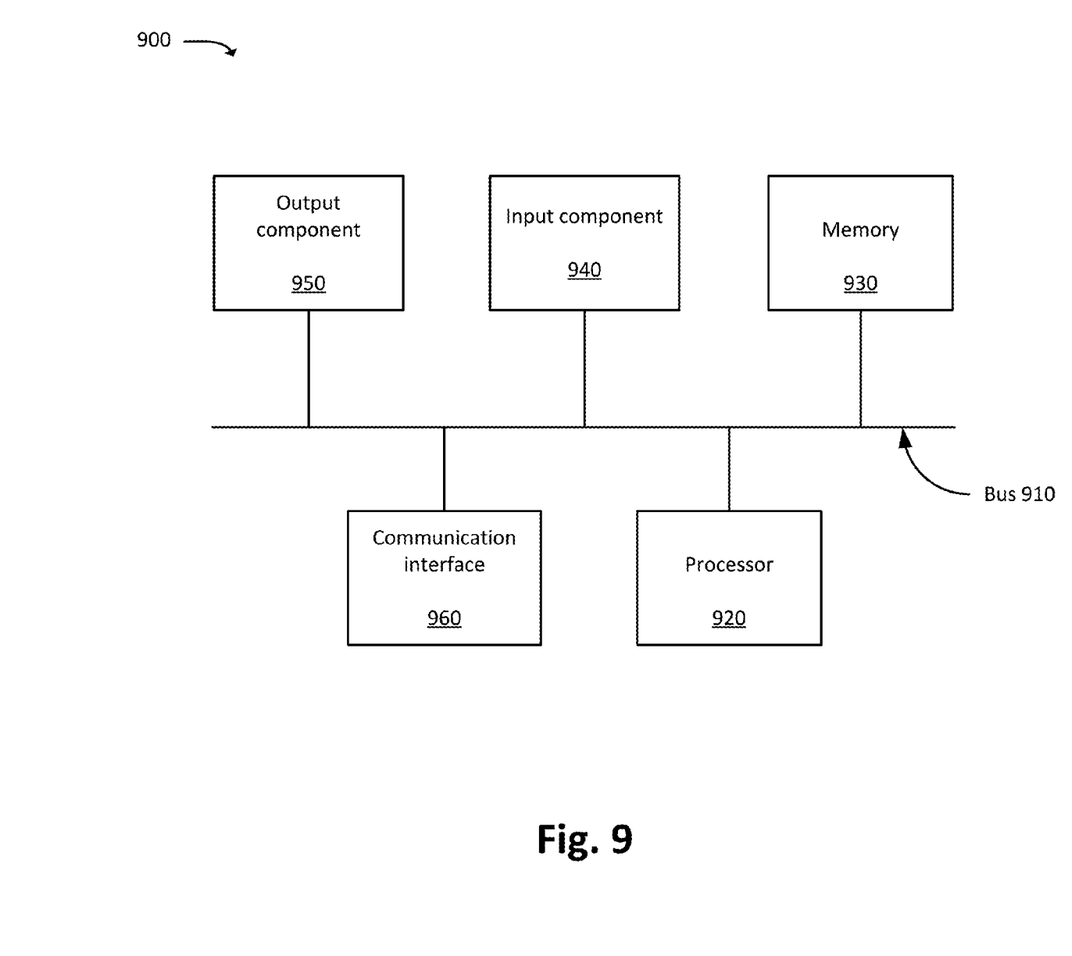
FIG. 9 illustrates example components of one or more devices, according to one or more implementations described herein.

FIG. 9 is a diagram of example components of device 900. One or more of the devices described above (e.g., with respect to FIGS. 1A, 1B, 2, 5-7, 8A, and 8B) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio (Bluetooth is a registered trademark of Bluetooth SIG, Inc.), radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 3 and 4, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 2A, 2B, and 3), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   detecting, by a user device and using a first radio associated with the user device, a presence of a location reference device,
      wherein the location reference device is a device that has determined its own location using at least one of:
         a cellular triangulation technique, or
         a Global Positioning System (GPS) technique;
   determining, by the user device, a location associated with the user device, the determining including:
      receiving, by the user device, location information from the location reference device, via the first radio, the location information including the location that was determined using at least one of the cellular triangulation technique or the GPS technique, and
      refraining, by the user device and based on detecting the presence of the location reference device, from determining the location of the user device using a second radio associated with the user device while the user device is within a communication range of the location reference device,
         wherein refraining from determining the location using the second radio is further based on determining that a signal strength of the communication, between the user device and the location reference device, via the first radio, exceeds a particular threshold signal strength;
   receiving, by the user device, a request for the location of the user device; and
   providing, by the user device and in response to the request for the location of the user device, the location of the location reference device.

2. The method of claim 1, wherein determining the location of the user device, via the first radio, consumes less power than determining the location of the user device via the second radio.

3. The method of claim 1, further comprising:
   detecting that communication between the user device and the location reference device has ended; and
   determining the location of the user device using the second radio based on detecting that the communication between the user device and the location reference device has ended.

4. The method of claim 1, further comprising:
   refraining from communicating via a third radio based on detecting the presence of the location reference device.

5. The method of claim 1,
   wherein the first radio includes at least one of:
      a radio frequency identification (RFID) radio,
      a Bluetooth Low Energy (BLE) radio, or
      a Near-Field Communications (NFC), and
   wherein the second radio includes at least one of:
      a Global Positioning System (GPS) radio,
      a cellular radio, or
      a "Wi-Fi" radio.

6. A system comprising:
   a user device, comprising:
      a non-transitory memory device storing a plurality of processor-executable instructions; and
      a processor configured to execute the processor-executable instructions, wherein executing the processor-executable instructions causes the processor to:
         detect, using a first radio associated with the user device, a presence of a location reference device,
            wherein the location reference device is a device that has determined its own location using at least one of a cellular triangulation technique or a Global Positioning System (GPS) technique,
            wherein the location reference device further stores location information that indicates a perimeter associated with the location reference device; and
         determine a location associated with the user device, wherein executing the processor-executable instructions, to determine the location, causes the processor to:
            receive location information from the location reference device, via the first radio, the location information including:
               the location that was determined using at least one of the cellular triangulation technique or the GPS technique, and
               the perimeter associated with the location reference device;
            refrain, based on detecting the presence of the location reference device, from determining the location of the user device using a second radio associated with the user device while the user device is within a communication range of the location reference device,
               wherein refraining from determining the location using the second radio is further based on determining that a signal strength of the communication, between the user device and the location reference device, via the first radio, exceeds a particular threshold signal strength;
receive a request for the location of the user device; and
provide, in response to the request for the location of the user device, the location of the location reference device.

7. The system of claim 6, wherein executing the processor-executable instructions, to refrain from determining the location using the second radio, causes the processor to:
power down the second radio,
switch the radio to an idle state, or
discontinue a process that determines the location using the second radio.

8. The system of claim 6, wherein executing the processor-executable instructions further causes the processor to:
detect that communication between the user device and the location reference device has ended; and
determine the location of the user device using the second radio based on detecting that the communication between the user device and the location reference device has ended.

9. The system of claim 6, wherein executing the processor-executable instructions further causes the processor to:
refrain from communicating via a third radio based on detecting the presence of the location reference device.

10. The system of claim 6,
wherein the first radio includes a Bluetooth Low Energy (BLE) radio, and
wherein the second radio includes at least one of:
a Global Positioning System (GPS) radio, or
a cellular radio.

11. A method comprising:
determining, by a location reference device, a geographic location of the location reference device, the location of the reference device being determined using at least one of:
a cellular triangulation technique, or
a Global Positioning System (GPS) technique;
detecting, by the location reference device, a presence of a user device;
determining, by the location reference device, a signal strength of a communication between the user device and the location reference device;
estimating, by the location reference device and based on the signal strength of the communication between the user device and the location reference device, a distance of the user device from the location reference device;
determining, by the location reference device, a location of the user device based on:
the determined geographic location of the location reference device, and
the estimated distance of the user device from the location reference device; and
outputting, by the location reference device, information identifying the location of the user device, the information identifying the location indicating a perimeter that is defined by the geographic location of the location reference device and the estimated distance of the user device from the location reference device,
the outputting causing the user device to refrain from determining the location of the user device using a particular radio, using the cellular triangulation technique or the GPS technique, while the user device is within a communication range of the location reference device,
wherein refraining from determining the location using the particular radio is further based on determining that a signal strength of a communication, between the user device and the location reference device, via another radio, exceeds a particular threshold signal strength, and
the outputting further causing the user device to provide, in response to a request for a location of the user device, the geographic location of the location reference device.

12. The method of claim 11, wherein outputting the information identifying the location of the user device further causes the user device to:
power down the particular radio,
switch the particular radio to an idle state, or
discontinue a process that determines the location of the user device using the particular radio.

13. The method of claim 11, wherein the location reference device is a non-mobile device, wherein the location reference device stores information identifying the geographic location of the location reference device,
wherein determining the location of the user device is further based on the stored information identifying the geographic location reference device.

14. The method of claim 11, wherein the location reference device is a mobile device.

15. The method of claim 11, wherein the particular radio includes at least one of:
a Global Positioning System (GPS) radio,
a cellular radio, or
a "Wi-Fi" radio.

16. The method of claim 1, wherein the location reference device stores information regarding a geographic location of the location reference device, and
wherein receiving the location information, from the location reference device, includes receiving the information regarding the geographic location of the location reference device.

17. The system of claim 6, wherein executing the processor-executable instructions, to refrain from determining the location using the second radio, causes the processor to refrain from determining the location using the second radio further based on a determination that the user device is located within the perimeter associated with the location reference device.

18. The system of claim 6, wherein the location reference device stores information regarding a geographic location of the location reference device, and
wherein receiving the location information, from the location reference device, includes receiving the information regarding the geographic location of the location reference device.

19. The system of claim 6, wherein the location reference device is a non-mobile device.

20. The method of claim 11, wherein the other radio includes at least one of:
a radio frequency identification (RFID) radio,
a Bluetooth Low Energy (BLE) radio, or
a Near-Field Communications (NFC).

* * * * *